United States Patent [19]

Freestone et al.

[11] Patent Number: 4,780,812
[45] Date of Patent: Oct. 25, 1988

[54] COMMON MEMORY SYSTEM FOR A PLURALITY OF COMPUTERS

[75] Inventors: William E. Freestone; David M. Leak, both of Lancashire, England

[73] Assignee: British Aerospace Public Limited Company, London, England

[21] Appl. No.: 115,651

[22] Filed: Oct. 27, 1987

Related U.S. Application Data

[63] Continuation of Ser. No. 848,920, Apr. 7, 1986, abandoned, which is a continuation of Ser. No. 501,092, Jun. 6, 1983, abandoned.

[30] Foreign Application Priority Data

Jun. 5, 1982 [GB] United Kingdom ............... 8216448

[51] Int. Cl.⁴ .............................................. G06F 15/16
[52] U.S. Cl. .................................................... 364/200
[58] Field of Search ............................... 364/200, 900

[56] References Cited

U.S. PATENT DOCUMENTS

| | | | |
|---|---|---|---|
| 3,959,775 | 5/1976 | Valassis et al. | 364/200 |
| 4,035,777 | 7/1977 | Moreton | 364/200 |
| 4,354,227 | 10/1982 | Hays et al. | 364/200 |
| 4,365,292 | 12/1982 | Barnes et al. | 364/200 |
| 4,449,183 | 5/1984 | Flahive et al. | 364/200 |

FOREIGN PATENT DOCUMENTS

| | | |
|---|---|---|
| 0029121 | 5/1981 | European Pat. Off. . |
| 0029131 | 5/1981 | European Pat. Off. . |
| 933474 | 8/1963 | United Kingdom . |
| 1354155 | 5/1974 | United Kingdom . |
| 2070826 | 2/1981 | United Kingdom . |

OTHER PUBLICATIONS

IBM Technical Disclosure Bulletin, vol. 19, No. 7, Dec. 1976, pp. 2725-2726, New York, U.S.; H. Buerge, et al.: "Dynamic slot allocation in date transmission system" (Entire document).

Electronics Letters, vol. 17, No. 24, Nov. 1981, pp. 924-925, London, GB, A. Gago, et al.: Low-Cost Multiprocessor System", FIGS. 1-3, pp. 924-925, left column, line 17.

*Primary Examiner*—Raulfe B. Zache
*Attorney, Agent, or Firm*—Cushman, Darby & Cushman

[57] ABSTRACT

A shared memory system for a plurality of computers comprises a memory linked to the computers via a series of ports which are opened in turn by a control means to grant access to the memory—the operation is such that the memory is apparently always available to each computer and no cumbersome handshake or interrupt routines need be involved. Access may be granted to every computer according to a fixed cyclic sequence or, in sequence, only to those computers which request such access. In the latter case particularly, it may be advantageous to assign a graded priority to the computers and to grant the access to the shared memory in priority order.

4 Claims, 2 Drawing Sheets

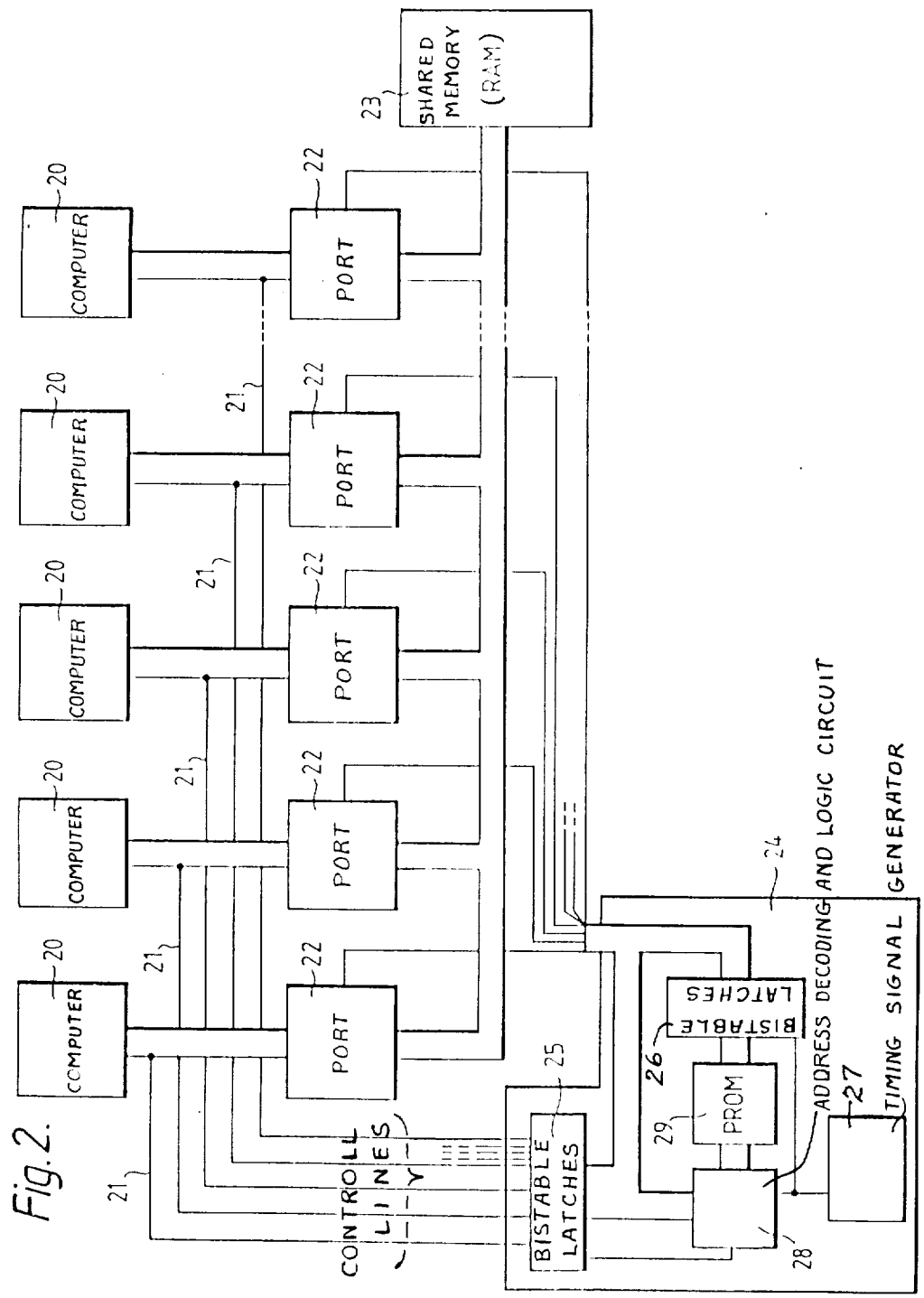

COMMON MEMORY SYSTEM FOR A PLURALITY OF COMPUTERS

This is a continuation of application Ser. No. 848,920 filed Apr. 7, 1986 which was abandoned upon the filing hereof and which was a continuation of Ser. No. 501,092 filed June 6, 1983, now abandoned.

BACKGROUND OF THE INVENTION

It is often necessary for two or more computers to communicate one with another and it is known for such communication to take place via standardized or manufacturer's own bus links, the respective computers being adapted, e.g. by the provision of suitable data-handling software, to accommodate the relevant link. In the known systems, the data transfer tends to involve an inordinate amount of time, usually due to the somewhat cumbersome software handling the transfer and the need for so-called synchronous "handshaking".

It is also known for a computer to comprise two or more processors which share the computer core memory or an area thereof.

SUMMARY OF THE INVENTION

In the present invention, a plurality of computers or computer processors are linked to common memory means via switching means which operates to connect each computer to the common memory means in cyclic sequence such that the common memory is apparently always available to each of the computers or processors.

BRIEF DESCRIPTION OF THE DRAWINGS

For a better understanding of the invention, reference will be made, by way of example, to the accompanying drawings, in which FIGS. 1 and 2 are block diagrams of respective computer memory sharing systems.

DESCRIPTION OF THE PREFERRED EMBODIMENT

Figure 1:
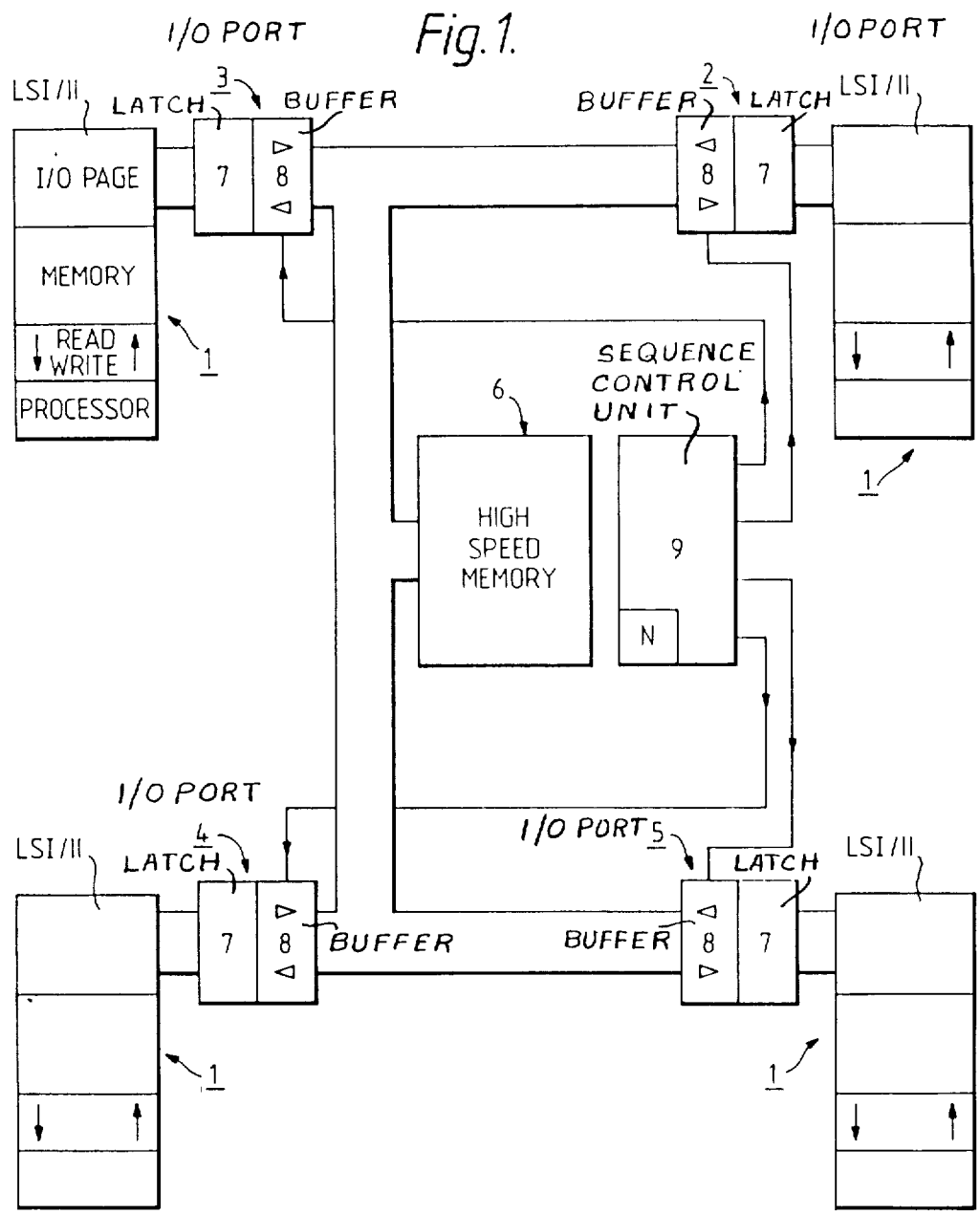

A group of addresses in a DEC LSI/11 computer is reserved as what is called an "Input/Output (or IO) page" through which the computer communicates with external machines. For external communications, the manufacturer provides its "QBUS" system in which first an address signal and then a data signal passes along the same set of bus lines. In the drawing, four DEC LSI/11 computers 1 are connected via respective ports 2, 3, 4 and 5 to a common high-speed memory board 6 having a 512 word capacity, the arrangement being such that the locations of memory 6 appear amongst the addresses reserved to the I/O page of each computer. This does not have to be so—instead, the memory 6 could be located amongst the addresses associated with the computer's own memory. It is preferred to use the I/O page however because this leaves all of the computer's internal memory free for other use.

Each of the ports 2 to 5 comprises a standard latching input/output device 7 connected to the common memory 6 via a two-way buffer arrangement 8. Each buffer arrangement has a control input connected to a respective output of a sequence control unit 9 (for example an oscillator, preferably one with a variable mark/space ratio, driving a counter) which enables the buffer arrangements in cyclic sequence, i.e. so that first one, then the next and then the next is enabled and so on. Each buffer arrangement is enabled for about 100 Nanoseconds and is then tristated for the next 300 Nanoseconds (during which the other buffer arrangements are being enabled in turn).

When any computer is to access the memory 6, it selects one of the addresses of the appropriate block thereof in the I/O page area and outputs the appropriate read/write control signal. The address signal is latched into the appropriate one of the ports 2 to 5 which then, each time its buffer arrangement is enabled, accesses the appropriate address in memory 6. Data at this address is then available to be read or, for a write operation, the data to be written is also latched into the port and, the next time this port is enabled, the data is entered.

As will be realised, by cyclically enabling the ports at such a speed that each computer has access to the common memory at least once during the normal memory access time, as far as the computer is concerned, the common memory is always available to it. Any data entered into the common memory becomes apparently immediately available to each of the computers—no special software has to be provided for organising the transfer of data and each computer can operate asynchronously with respect to the others.

Naturally, the common memory 6 and the ports have to be operable at a sufficiently high speed to allow proper read and write operations during the time that each port is enabled. This requirement is not particularly onerous however—the memory could be implemented with high-speed devices, for example Shottky memory chips, but no particularly special implementation is usually necessary.

As already mentioned, the common memory does not have to be accessed via the I/O page address block. Also, the invention is not only applicable to the aforementioned make of computer and bus system. By way of example, it is also applicable to communication between a plurality of PDP11 computers using the "UNIBUS" system for linking. Also the access and cycle times may be varied as desired from the examples given, as can the capacity of the common memory.

It will also be appreciated that the common memory does not have to occupy the same set of addresses in each computer, i.e. the start address for the common memory can be different for each computer if required.

If the shared memory system described with reference to FIG. 1 is extended to include substantially more than four ports, i.e. to allow more than four separate computers to access the memory, the memory access time for each computer may become noticeably slower. In such a case, it may be desirable to modify the system so that, instead of making the memory available to every computer in fixed sequence, it is only made available to those computers which presently require access to it. As a furher modification, instead of the memory being made available to the computers in fixed sequence, the sequence can be varied to take account of a priority preassigned to each computer, for example in accordance with the frequency at which each computer is likely to require access to the shared memory. The system shown in FIG. 2 incorporates one of several possible implementations of these two modifications. Sixteen separate computers 20 are here connected via their communication buses and respective switchable ports 22 to a shared memory 23. A control line 21 forming part of each bus is taken to a respective input of an arbitration circuit 24, which circuit has sixteen outputs connected to the control inputs of respective ones of the ports 22. The arbitration circuit 24 comprises two sets 25 and 26 of bistable latches, a timing signal generator 27, an address-decoding and logic circuit 28 and a programmable read-only memory 29. Each computer is arranged so that, when it requires access to the shared memory 23, it places a particular logic signal on its communication-bus control line 21. The combination of signals appearing on all these lines 21 is latched into the set of latches 25 at the start of a memory access cycle. The latched signal combination is applied to the address-decoding and logic circuit 28 which thereby addresses a 16 bit wide location within the read-only memory 29 corresponding to the particular signal combination. Each location within the memory is pre-filled with a series of bits, one of which has a value which will switch on or enable the ports 22 while all the others have the value which does not so enable the ports 22. The signal at the addressed location within memory 29 is latched into the set of latches 26 and, from there, respective bits of the signal are applied to the port control inputs to turn one and only one of these ports on. The memory contents are so arranged of course that the port which is so turned on is the one which, for any given combination of computers presently requesting memory access, is connected to the highest priority computer. Thus, this computer is now connected to memory 23. The signal held in latches 26 is also fed back to the latches 25 as a reset signal whereby that one of the latches 25 connected to the computer which is being granted access to the memory 23 becomes reset. When this happens, the combination of signals fed from latches 25 to the decoding circuit 28 changes, a corresponding new location within memory 29 is addressed and a new signal becomes available at the inputs to the latches 26. This new signal will of course have a value operable for enabling the port 22 which is connected to the second highest priority one of the computers requiring access to memory 23. After a predetermined access time set by the timing generator 27, the new signal from memory 29 is latched into the latches 26 and hence applied to the ports 22. Thus, the second highest priority computer becomes connected to memory 23 and meanwhile the relevant latch in set 25 is reset so that the memory 26 makes available a signal which will enable the port connected to the third highest priority computer. On lapse of a further predetermined access time, this signal is latched into latches 26 and the third highest priority computer is connected to the memory 23. The sequence continues like this until all the memory access requests which were latche into the latches 25 at the start of the memory access cycle have been cleared. The absence of any further memory requests latched into latches 25 is sensed by the address-decoding and logic circuit 28 which then operates to cause whatever new combination of signals is then present on control lines 21 to be latched into latches 25 whereupon a new memory access cycle begins.

The duration of each memory access cycle is thus variable—it depends upon the number of computers requesting memory access at the start of the relevant cycle. At its longest, it would equal sixteen times the predetermined access time or clock cycle set by the generator 27. Thus, in the worst case (with all the computers requesting memory access simultaneously), the lowest priority computer will gain access near the end of this sixteen clock pulse cycle, e.g. if the generator 27 operates at 16 MHz, within about one microsecond.

We claim:

1. A shared memory system for use with a plurality of computers, the system comprising:
    a memory, having an input/output bus for receiving address information and input data to the memory and for supplying output data from the memory,
    a plurality of switchable ports connected to said bus adapted to be connected to respective ones of a plurality of computers, each port being switchable between open and closed states in which the port respectively does and does not admit communication between said memory and one of said computers, and
    control means connected to said ports, for causing at least a selected number thereof to be switched to the open state thereof one after another in sequence, wherein the control means comprises a plurality of inputs adapted to be connected to receive memory access request signals from respective ones of said computers, and wherein said control means operates to switch sequentially to the open state thereof only the ports associated with computers which have supplied a memory access request signal.

2. A system according to claim 1, wherein said control means comprises a memory containing information indicative of a pre-assigned priority for each said port, wherein said control means operates to switch the ports to the open state thereof in the order of said priority.

3. A shared memory system for use with a plurality of computers, the system comprising:
    a memory having an input/output bus for receiving address information and input data to the memory and for supplying output data from the memory, a plurality of switchable ports connected to said bus and suitable for connection to respective ones of a plurality of computers, each said port being switchable between opened and closed states in which the port respectively does and does not allow communication between said memory and said plurality of computers; and
    control means, connected to said ports, said control means comprising a memory comprising information indicative of a pre-assigned priority for each said port, said control means for switching said ports to the open state thereof in the order of said priority.

4. A system according to claim 3, wherein said control means further comprises a plurality of inputs for being connected to receive memory access request signals from respective ones of said computers, and said control means is for switching sequentially to the open state thereof only the ports associated with computers which have supplied a memory access request signal.

* * * * *